Jan. 13, 1959

C. W. CLAPP 2,869,074

SINGLE-TURN COIL FOR METAL DETECTOR

Filed Oct. 26, 1953

Inventor:
Charles W. Clapp,
by Howard D. Schlenker
His Attorney.

Jan. 13, 1959

C. W. CLAPP 2,869,074

SINGLE-TURN COIL FOR METAL DETECTOR

Filed Oct. 26, 1953

Inventor:
Charles W. Clapp,
by Howard D. Ahlander
His Attorney.

Jan. 13, 1959
C. W. CLAPP
2,869,074
SINGLE-TURN COIL FOR METAL DETECTOR
Filed Oct. 26, 1953
4 Sheets-Sheet 3
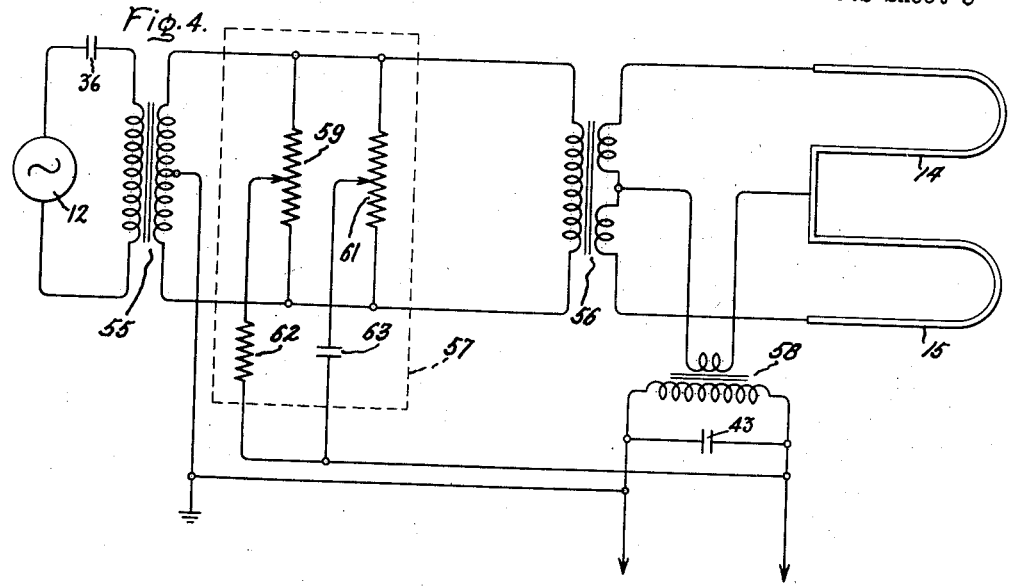
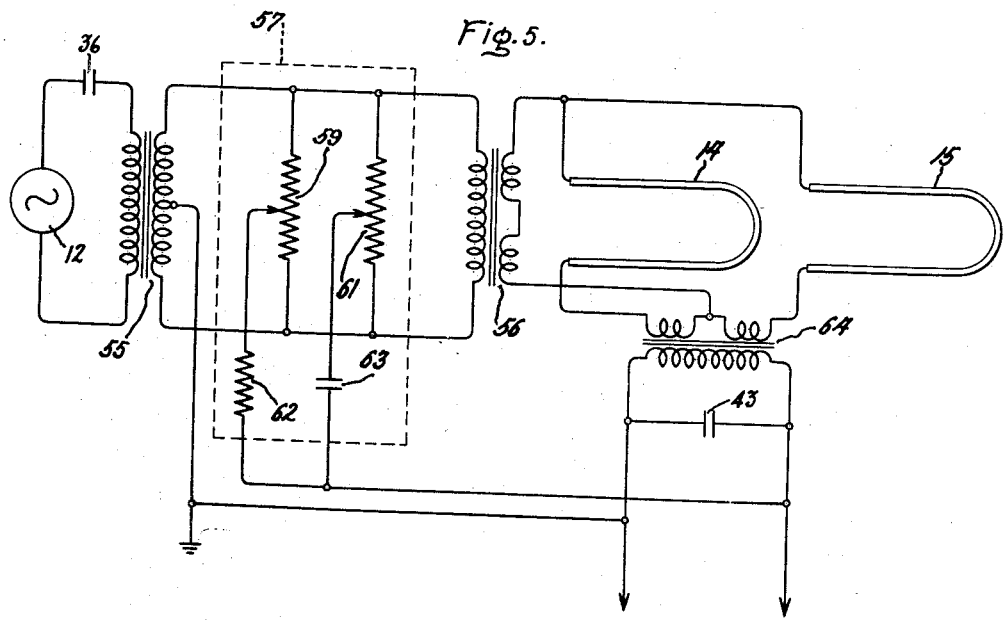
Inventor:
Charles W. Clapp,
by Howard J. Ahlauske
His Attorney.

Jan. 13, 1959 C. W. CLAPP 2,869,074
SINGLE-TURN COIL FOR METAL DETECTOR
Filed Oct. 26, 1953 4 Sheets-Sheet 4

Inventor:
Charles W. Clapp,
by Howard E. Ahlander
His Attorney.

United States Patent Office 2,869,074
Patented Jan. 13, 1959

2,869,074

SINGLE-TURN COIL FOR METAL DETECTOR

Charles W. Clapp, Scotia, N. Y., assignor to General Electric Company, a corporation of New York Application October 26, 1953, Serial No. 388,195

6 Claims. (Cl. 324—41)

The present invention relates to an improved metal detecting apparatus of the inductance type, and to a new and improved detecting head assembly therefor. More particularly, the invention relates to a new and improved inductance type detecting head assembly that is ideally suited for metal detecting apparatus intended for use with endless belt conveyors or chutes to detect the presence of tramp metal in materials carried by such conveyors.

There are a number of different metal detectors available commercially which operate on the principle of detecting either a change in the mutual inductance, or a change in the self-inductance, of some component of a detecting head assembly or coil arrangement which comprises a part of the metal detecting apparatus. In both these types of metal detectors, the change in self-inductance or mutual inductance, as the case may be, is brought about by the presence of tramp or foreign metallic particles in the magnetic field produced by the detecting head assembly, and is used to produce an output electrical signal indicative of the presence of such tramp or foreign metallic particles. Metal detectors of both types find application in a large number of manufacturing and raw material processing fields; however, their use in the past has been somewhat restricted because of their relatively high cost. Hence, there has been a long felt need for a relatively low cost metal detector. The provision of such a detector has been complicated, however, by the fact that no corresponding sacrifice in the performance of the detector could be tolerated.

From a study of existing techniques, it has been determined that a source of considerable expense in known metal detectors is the construction of the detecting head assembly, for, prior to the present invention, the known detecting head assemblies required specially designed coil forms for supporting one or more electrical windings having a large number of turns. Each of the coil forms had to be specially constructed to meet the needs of a specific installation, and therefore, was a source of considerable expense. As a consequence of the requirement for a specially constructed detecting head assembly, the manufacture of known metal detectors was rendered more difficult than it otherwise would be, and the cost thereby increased. Also, the multi-turn coil construction of the detecting head assembly generally required the use of housings in conjunction with the detecting coils to provide electrostatic shielding from outside disturbances, and such housings increased the cost of the detector. Further, since it is most desirable to pass the material to be inspected through the coils rather than between several such coils, the multi-turn coil construction complicated the installation of such detectors, and further detracted from their desirability. This latter factor is particularly troublesome if the metal detector is to be used in conjunction with an endless belt conveyor for detecting tramp metal in materials carried by such conveyors, since its installation necessarily required that the endless belt of the conveyor be broken in order to mount the detecting head assembly in operating position with relation to the conveyor belt. As a consequence, since most manufacturers object to cutting and re-splicing conveyor belts, they have heretofore used the less satisfactory method of passing the material to be inspected between several such coils, or past the coils in a direction parallel to the plane of the detecting coils, with a resultant loss of sensitivity. In addition to the above factors, it should be noted that, in many applications of metal detectors, the detector has to be installed adjacent to heavy machinery. In most cases, such installation subjects the detector to vibrations of considerable magnitude and causes relative movement between the individual turns of a winding or between windings of the presently known detector coil arrangements, thereby generating undesired noise signals and reducing the effective sensitivity of the instrument.

It is, therefore, an object of the present invention to overcome the above-recited objections, as well as other additional objections, to presently known metal detecting apparatus by the provision of an improved metal detector circuit, which incorporates a new and improved detecting head assembly that is simple in construction and relatively inexpensive to manufacture.

Another object of the invention is to provide an improved metal detecting apparatus having a new and improved detecting head assembly construction that does not require electrostatic shielding, and that may be readily assembled around or removed from a continuous conveyor belt without cutting the belt.

A further object of this invention is to provide a circuit and detecting head assembly, which is inherently superior, in regard to mechanical stability and rigidity, to presently used forms, and which may be subjected to vibrations of considerable magnitude without seriously affecting its operation.

In practicing the invention, a detecting head assembly for a metal detecting apparatus is provided which includes one or more single-turn coils. An energizing circuit means is operatively coupled to the single-turn coils for inducing electric current flow through the coils to produce an inspection field throughout an area through which the material to be monitored is passed. Output circuit means are also operatively coupled to the single-turn coils for deriving an electric output signal indicative of the change in self-inductance of the coils by reason of the appearance of a foreign metallic particle in the inspection field thereof.

Other objects, features, and many of the attendant advantages of this invention will be more fully appreciated as the same become better understood by reference to the following detailed description, when considered in connection with the accompanying drawings, wherein like parts in each of the several figures are identified by the same reference character, and wherein:

Fig. 4 is a schematic circuit diagram of an alternative circuit arrangement of the novel detecting head assembly;

Fig. 5 is a schematic circuit diagram of a modification of the circuit arrangement shown in Fig. 4;

Figure 1:
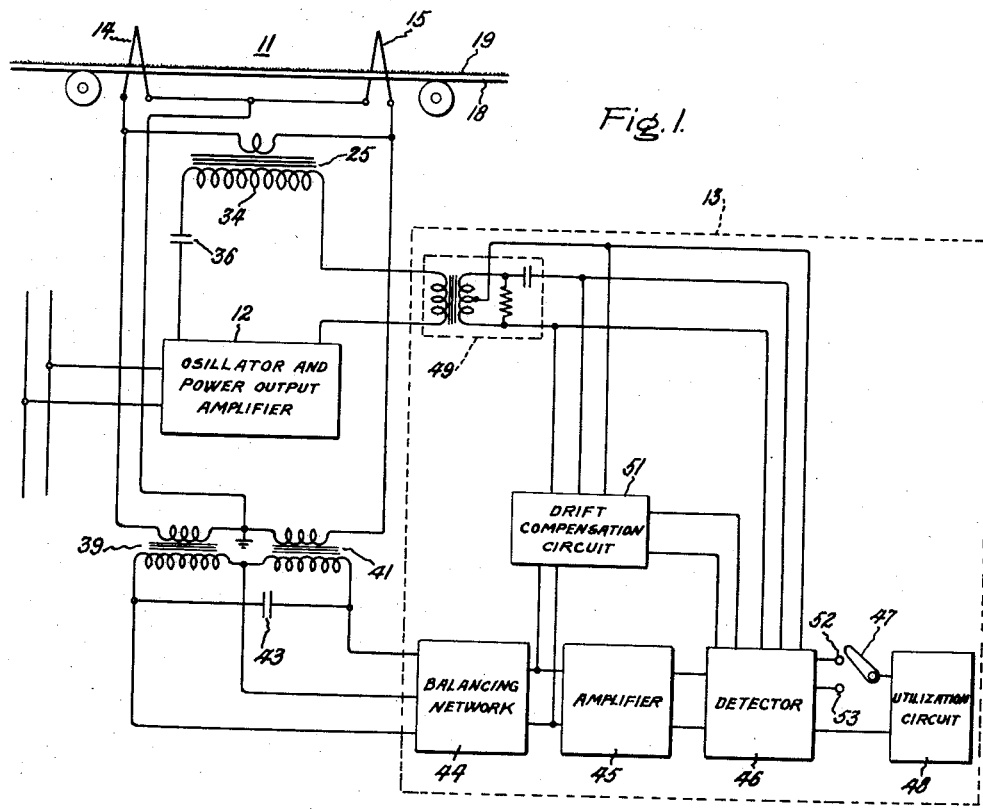
Fig. 1 is a schematic block diagram of one embodiment of an improved metal detecting apparatus utilizing a detecting head assembly constructed in accordance with the present invention, and illustrates one manner in which the detecting head assembly may be used.

The embodiment of the improved metal detecting apparatus illustrated in Figs. 1, 2, and 3 includes a new and improved detecting head assembly 11 described more fully hereinafter, a source of oscillation 12 coupled to the detecting head assembly 11 for exciting the same, and an output detecting circuit 13, likewise coupled to the detecting head assembly 11 for deriving an output electric signal indicative of the passage of a foreign metallic particle through the magnetic field produced by the detecting head assembly.

In its preferred form, the detecting head assembly 11 comprises two spaced-apart, single-turn coils 14 and 15. Both of the coils 14 and 15 are mounted about and encircle an endless belt 18 of a conveyor system that carries a material 19 to be monitored for foreign or tramp metal particles. The single-turn coils 14 and 15 are serially interconnected, and the series electrical circuit thus formed is coupled to the source of oscillation 12 so that the same electric current is caused to flow through each of the coils. This current develops a voltage drop across each coil which depends essentially on the magnitude and phase angle of the self-impedance of the coil. When the self-impedances of the two coils are equal, equal voltages will appear across the coils. The coils are so connected to each other that, when the voltage drops across the coil are equal, no output signal is delivered to the detecting circuit 13. However, if a foreign metallic object, embedded in material 19 is carried into the field of one of the coils, it will, by virtue of its magnetic permeability and/or electrical conductivity, cause a change in the self-impedance of that coil. This change in self-impedance causes a change in the voltage appearing across that coil, and destroys the voltage balance between the coils. Thus, a signal appears in the input to detecting circuit 13, which is suitably amplified and rectified in the detecting circuit, as will later be explained in detail, produces an output electric signal or alarm which is indicative of the passage of a foreign metallic particle through the magnetic inspection field produced by the detecting head assembly 11.

Figure 2:
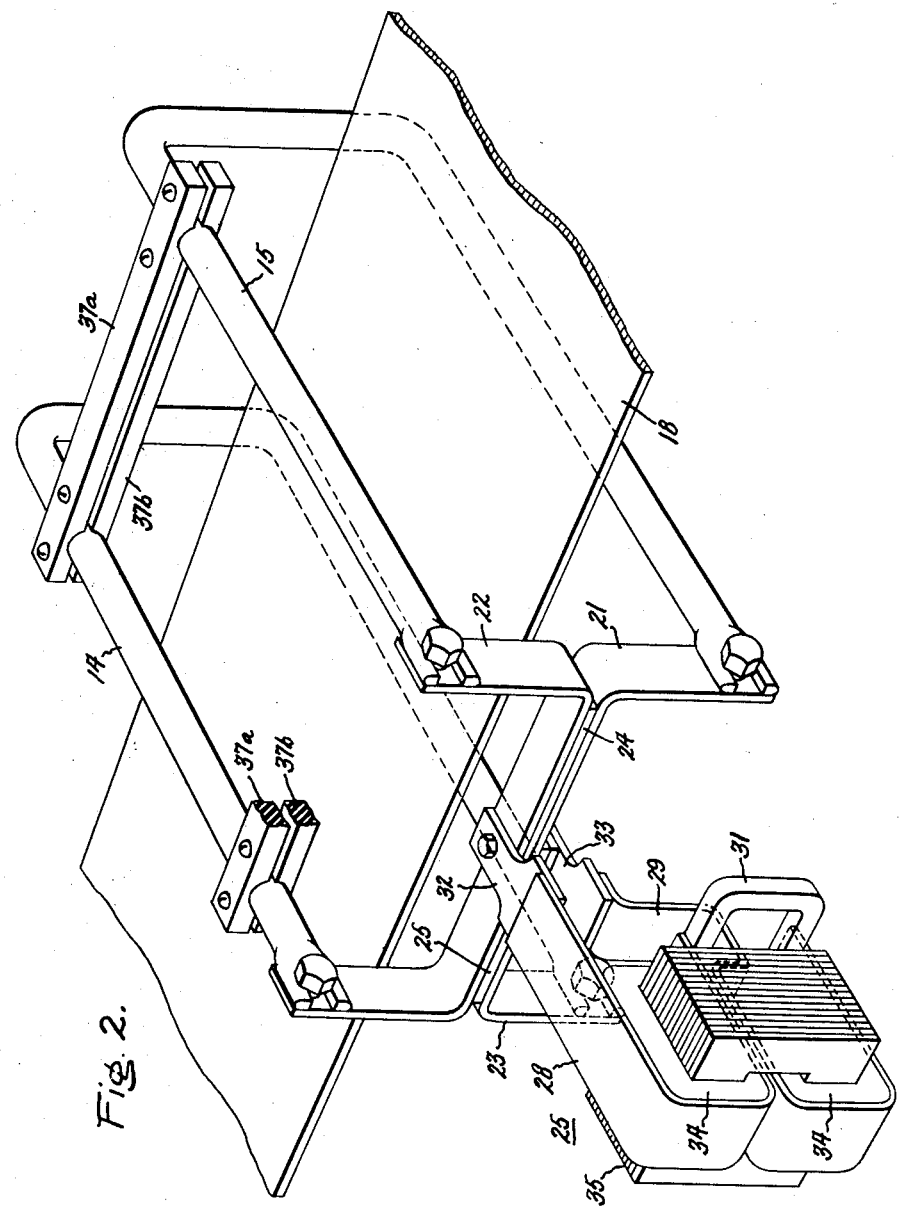
Fig. 2 is a perspective view of a preferred mechanical construction of the single-turn coils comprising a part of the novel detecting head assembly.

Referring now to Fig. 2 of the drawings, each of the single-turn coils 14 and 15 preferably comprises an elongated, electrically conductive member which has a cross-section that is sufficiently large to render the member mechanically rigid, and which is shaped lengthwise in the form of a U with the ends thereof spaced apart in the manner illustrated. The single-turn loops thus constructed may be made from standard aluminum or copper piping having an outside diameter in the order of 1 to 1½ inches, or, if desired, may be constructed of an electrically conductive member having a generally rectangular cross section. However, it is preferred that tubular members be used for the reason that such members may be more readily bent or shaped with standard bending tools, so that the detecting head assembly can be inexpensively tailored for use on a particular installation. While the single-turn coils 14 and 15 have been described as hollow, it should be understood that such a limitation comprises only a material-saving expedient, and if desired, the members could be constructed of a solid material. The only stringent requirements of the material are that it have high electrical conductivity and mechanical rigidity, so that it is able to maintain its position and shape when subjected to vibration and the wear and tear of usage. Hence, it must be mechanically strong since relative motion between parts of any one coil or, to a lesser degree, between the coils themselves reduces the useable sensitivity of the detecting head assembly and is therefore to be avoided. Further, while the single-turn loops 14 and 15 have been illustrated and described as comprising integral U-shaped members, it should be understood that satisfactory single-turn coils may be formed from two L-shaped members joined together in a manner to form a U, or in some other similar fashion.

An electrically conductive Z-shaped member 21, having a relatively high electrical conductivity, is provided for connecting the respective single-turn loops 14 and 15 in series circuit relationship; that is, the member 21 interconnects the upper end of the single-turn loop 14 with the lower end of the single-turn loop 15. The ends of each of the single-turn loops 14 and 15 are flattened in the manner shown to provide good electrical connections.

The remaining ends of each of the single-turn coils 14 and 15 have L-shaped members 22 and 23, respectively, secured thereto, and interposed between each of the L-shaped members 22 and 23 and the middle portion of member 21 are spacers 2 and 5, which are constructed of an electric insulating material. Each of the members 21, 22 and 23 is constructed of a material having relatively high electrical conductivity, and is rigidly secured to the respective single-turn coils 14 or 15, either by bolts, or by some other suitable method capable of withstanding the jarring and mechanical vibrations to which the assembly is subjected when in service.

An exciting transformer 25 of the voltage step-down type having a high impedance primary winding, has essentially a double-turn secondary winding connected across the serially connected single-turn coils 14 and 15. Since transformer 25 is designed to obtain the best possible impedance match with the single-turn coils, its secondary winding comprises a pair of wide, thin plates 28 and 29 having high electrical conductivity. The plates 28 and 29 are generally U-shaped, and are disposed side by side with their open ends located adjacent one another. A U-shaped bar 31, likewise having high electrical conductivity, is provided for serially interconnecting the two single-turn coils comprised by plates 28 and 29 in a standard series-aiding arrangement. The U-shaped bar 31 has its ends welded or otherwise secured to corresponding ends of the U-shaped plates 28 and 29, and the remaining ends of the U-shaped plates have terminal posts 32 and 33, respectively, secured thereto by welding or other suitable means. The terminal posts 32 and 33 then provide a readily accessible means for connecting the serially connected plates 28 and 29 to the L-shaped, electrically conductive members 22 and 23, respectively, and thereby effectively couple the secondary winding of the input transformer 25 across the serially connected single-turn loops 14 and 15 in the manner shown.

The primary winding 34 of the transformer 25 is physically disposed entirely within the space enclosed by the plates 28 and 29, and a laminated core structure 35 is provided for improving the coupling and efficiency of the transformer. The primary winding 34 is preferably comprised of an electrically conductive wire, having a relatively small diameter in comparison to the cross-sectional dimensions of the plates 28 and 29, and has a large number of turns around the leg portions of the laminated core structure 35 in comparison to the number of turns provided by the above-described secondary winding construction, so that the transformer 25 has a relatively large primary-to-secondary windings turn ratio. The primary coil winding 34 is wound about the leg portions of the laminated core structure 35 in a standard series-aiding and/or humbucking arrangement, so that troublesome interfering fields are reduced to a minimum, and is connected in electrical series circuit relationship with a capacitor 36. The capacitor 36 preferably has a value of capacitance such that the electrical series circuit formed by capacitor 36 and the primary winding 34 is resonant at the operating frequency of the source of oscillations 12. By this means, the detecting head 11, which would otherwise present a highly inductive load, can be made to present substantially a resistive load to the source of oscillations 12, and thereby improve the efficiency of operation of the detecting head assembly and create as large a magnetic field as possible with any given power source.

Referring again to Fig. 2 of the drawings, the electrically conductive single-turn loop 14, and the electrically conductive single-turn loop 15 are rigidly supported in spaced relationship by means of pairs of rods 37a and 37b. The rods 37a and 37b are constructed of a mechanically rigid insulating material and each pair is secured to each of the single-turn coils by means of bolts or other fastenings. The resulting structure provides a highly stable mechanical support for maintaining the single-turn loops 14 and 15 in proper spaced relationship. Because of the low impedance presented by the coils 14 and 15, there is, in general, no necessity to shield the coil structure from extraneous electrostatic pickup, although such electrostatic shielding can readily be added if required.

In order to derive output electric signals from a detecting head assembly constructed in the above-described manner, the primary windings of a pair of voltage step-up transformers 39 and 41 are connected across the separated ends of the single-turn coils 14 and 15, respectively. The step-up transformers 39 and 41 have a relatively large secondary-to-primary windings turn ratio but otherwise are of standard construction. The secondary windings of transformers 39 and 41 are connected in a series-opposing circuit relationship, and a tuning capacitor 43 is coupled thereacross for resonating the circuit thus formed at the operating frequency of the detecting head assembly. If desired, the voltage step-up transformers 39 and 41 may be structurally mounted on one of the cross pieces 37, on a supporting platform together with the exciting transformer 25, or attached directly to the ends of the coils, so that the detecting head assembly can be consructed in pre-assembly operation, and subsequently installed as a sub-unit of the overall metal detecting apparatus.

It can now be appreciated that the construction of the detecting head assembly lends itself to mass production techniques. Further, because only single-turn coils are used in the detecting head, no special coil forms are required and the cost of the assembly is reduced. Since mutual inductance between the two coils of the assembly plays only a secondary role in the operation of the detector, it is relatively insensitive to slight motions of one coil with respect to the other, such as might be caused by mechanical vibration. Any small change in mutual inductance that might occur due to small relative movement between the coils causes like changes in the voltage drops across the two coils and no output signal is produced. Additionally, because of the simplicity of the single-turn coil construction, the new and improved assembly can easily be modified to meet the requirements of specific applications, for the single-turn coils of the assembly can readily be bent or shaped with standard bending tools into a desired form. Hence, metal detecting apparatus utilizing such detecting head assemblies can readily be tailored to provide satisfactory performance in any particular application, and also to facilitate installation of the apparatus.

In operation, the single-turn coils 14 and 15 are energized by a relatively large current developed in the secondary winding of input transformer 25 and therefore produce a magnetic inspection field around each of the single-turn coils. The magnetic inspection field, by its reaction on the coils, gives rise to the principal reactive component of the voltage drops across the coils as mentioned earlier. The voltages induced in the two coils are substantially equal in magnitude and phase, if there are no foreign metallic particles disposed within the field of either coil. The secondary windings of the voltage step-up transformers 39 and 41 are connected in series opposing relationship; therefore, when foreign metallic particles are absent, the voltages across the combined secondaries induced by the magnetic inspection fields are balanced out, and no net output signal is produced across the secondary windings of the output step-up transformers 39 and 41. However, should a foreign metallic particle enter the varying magnetic field of either coil, the voltages in the primary windings of the voltage step-up transformers are altered, and a net output signal will be produced, which is indicative of the presence of the foreign metallic particle in the inspection field. If the foreign metallic particle is magnetic in nature, and enters the neighborhood of the detecting head assembly, for example, from left to right, passing first through the magnetic field produced by coil 14, and then through the field produced by 15, at the outset more flux will link the coil 14 than that which links coil 15, and, therefore, the balance of the voltages in the primary windings of transformers 39 and 41 will be disturbed and it will result in the production of an output signal. On the other hand, if the foreign particle is non-magnetic in nature, eddy currents will be produced therein by the magnetic field, which will cause a change in the flux threading the coil 14 from that which threads coil 15, and will likewise result in disturbing the balance of the voltages in the primary winding of transformers 39 and 41, thereby producing an output signal. In either event, an output signal is produced. Hence, it can be appreciated that changes in the flux threading the detecting coils of the detecting head assembly are one value if the small foreign metallic particle is magnetic in nature, and of a different value if the particle is non-magnetic but conductive in nature. This change is such that the output signals caused by the presence of the two different types of particles have different phase angles, and can be detected by a suitable phase discriminating detector to determine whether the metallic particles observed by the detecting head assembly are essentially magnetic or non-magnetic in character. This phase discriminating detector comprises a part of the output detecting circuit 13.

The output detecting circuit 13 includes a balancing network 44, an amplifier 45, and a phase discriminating detector 46 and output circuit 48, which are all similar in construction to corresponding elements of a metal detecting apparatus described in U. S. Patent 2,489,920, P. C. Michel, issued November 29, 1949, and operate in substantially the same manner. Hence, for a complete description of the construction and manner of operation of these elements, reference is made to such patent. However, for the purpose of the present disclosure it is believed sufficient to point out that balancing network 44 comprises a plurality of interconnected resistors and capacitors, so arranged that no output is obtained from the series-connected secondary windings of transformers 39 and 41 when there is no foreign metallic particle in the material 19 carried on endless belt 18. Hence, it is assured that no output signal is fed through amplifier 45 to detector 46, and thence to the utilization circuit 48 until a foreign metallic particle enters the inspection area produced by the detecting assembly. Upon the appearance of a foreign metallic particle in the material passing through the single-turn coils 14 and 15, the balanced or null condition is disturbed in the previously described manner, so that an output electric signal indicative of the appearance of such metallic particles, is fed through amplifier 45 to the phase discriminating detector 46. The detector 46 is a dual phase-sensitive detecting circuit utilizing a pair of electronic tubes, which are made to be phase-selective by means of a pair of sensitizing signals, one of which is obtained directly from the source of oscillations 12 and is in phase with the energizing current supplied to the single-turn coils of the detecting head assembly, and the other of which is obtained from the source of oscillations 12 through a 90-degree phase shifting circuit 49 and is 90-degree out-of-phase with the current supplied to the single-turn coils of the detecting head assembly. Further details of construction, and a more complete description of the manner of operation of the detecting circuit 46 can be obtained by reference to the above-identified U. S. patent; however, briefly, the detector serves to derive an output signal at one output terminal 52, if the unbalance signal from the coils has the characteristic phase resulting from the presence of a magnetic foreign particle, and an output signal at another terminal 53 if the unbalance signal has the characteristic phase resulting from the presence of a conducting but non-magnetic foreign particle. One or other of these output signals is then coupled to utilization circuit 48 through the selector switch 47. If it is desired to obtain an output indication of only those foreign metallic particles which are magnetic in character, the movable contact of selector switch 47 can be set on terminal 52 connected to the portion of the detector 46 output circuit that derives an output signal in accordance with the occurrence of such particles. Likewise, if it is desired to detect only those foreign metallic particles, which are non-magnetic in character, the selector switch 47 can be set on terminal 53 connected to the portion of the detector 46 output circuit which derives an output signal in response to the appearance of a non-magnetic metallic particle in the inspection area of the detecting head assembly. Should it be desired to obtain an output indication of the occurrence of both magnetic and non-magnetic particles, the outputs of portions of phase discriminating detector 46 may be used simultaneously.

Further, an output signal indicative of the passage of both magnetic and non-magnetic particles through the inspection field, can be obtained from one portion of the phase discriminating detector by adjusting the phase of the sensitizing signals so that the particular detector portion used is sensitive to both types of signals. This expedient may be used where differentiation between magnetic and non-magnetic particles is not required, for although such a modification might result in a slight reduction in the sensitivity of the circuit, it does allow the use of a somewhat simpler and cheaper utilization or alarm circuit.

As an additional refinement, a drift compensation circuit 51 may also be included in the output detecting circuit 13 for maintaining the detecting circuit in properly balanced condition, irrespective of drift resulting from temperature changes and other factors tending to deleteriously affect normally balanced relationship of the circuit. For a more detailed disclosure of the construction and manner of operation of the drift compensation circuit, reference is made again to the above-identified U. S. patent.

Figure 3:
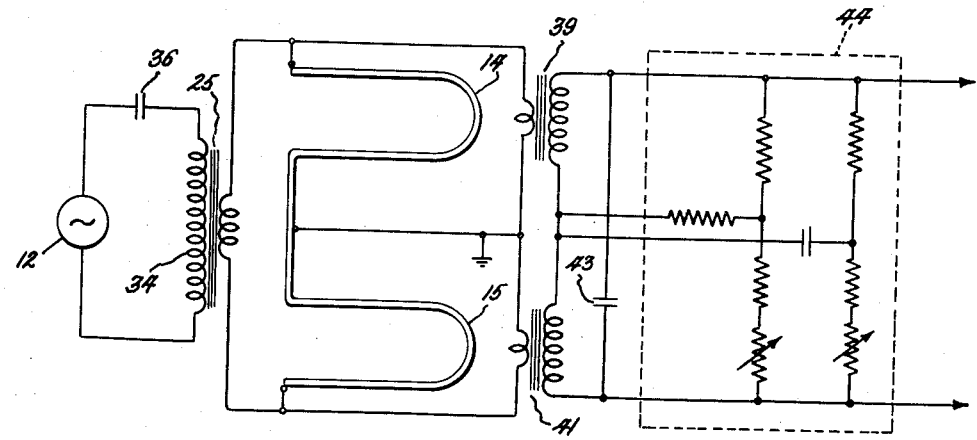
Fig. 3 is a schematic circuit diagram of a preferred circuit arrangement of the novel detecting head assembly.

In place of the arrangement shown in Figs. 1 and 3, the circuit may be connected as shown in Fig. 4. The source of oscillation 12 is connected in series with resonating capacitor 36 to the primary of an exciting transformer 55, and the secondary winding of transformer 55 is joined to the primary winding of a step-down impedance matching transformer 56 through a balancing network 57. The secondary of transformer 56 comprises essentially two series-connected windings connected across the serially connected single-turn coils 14 and 15. The primary winding of a step-up output transformer 58 is connected between the midpoint of the secondary windings of transformer 56 and the midpoint of the serially connected single-turn coils 14 and 15, so that, when there is no foreign metallic object in the field of either of the coils, there is substantially no current flowing in the primary winding of the output transformer 58. The secondary winding of output transformer 58 has a tuning capacitor 43 connected thereacross and a signal appearing across the secondary winding of the transformer is connected into the remainder of the circuit, comprising an amplifier, phase discriminating detector and output circuit, as shown in Fig. 1.

Because of the practical difficulty of constructing the two halves of the secondary winding of transformer 56 electrically, identically and similarly constructing the two single-turn coils 14 and 15, it is necessary that means be provided to eliminate any signal which might appear across the secondary of output transformer 58, due to unbalance in the primary circuit, when there is no foreign metallic object in the fields of the coils 14 and 15. This function is served by the balancing network 57, which comprises potentiometers 59 and 61 connected in parallel across the secondary winding of transformer 55. The movable contact pickoff arm of potentiometer 59 is connected through resistor 62 to one side of the secondary of output transformer 58, and the movable contact pickoff arm of potentiometer 61 is similarly connected through a capacitor 63. The midpoint of the secondary winding of transformer 55 is connected to ground, as is the other side of the secondary winding of output transformer 58, and by adjusting potentiometers 59 and 61, a signal may be introduced to oppose any output signal from transformer 58, when there is no foreign metallic object in the field of coils 14 and 15, and thus effectively eliminate the unwanted signal.

The operation of the circuit arrangement shown in Fig. 4 is like that previously discussed, and is obvious to one skilled in the art. The primary advantage of this circuit over that shown in Figs. 1 and 3 is that the energizing transformer 55 may be of conventional design rather than the more costly step-down type required in the circuit previously discussed.

The circuit arrangement of Fig. 4 may be modified as shown in Fig. 5, wherein the single-turn coils 14 and 15 are connected in parallel. The step-down impedance matching transformer 56 is energized in a manner identical to that previously described with reference to Fig. 4. However, one end of each of the single-turn coils 14 and 15 is connected to one end of the secondary winding of transformer 56, and the other ends of the coils are connected to opposite ends of a center-tapped primary winding of step-up output transformer 64. The center tap of the primary windings of the output transformer 64 is connected to the remaining end of the secondary winding of transformer 56 so that, when equal currents flow through the coils 14 and 15, the currents through the two halves of the primary winding of output transformer 64 oppose one another and no output signal appears.

The balancing network 57 serves the same function as in the circuit arrangement of Fig. 4, and provides a signal which opposes any signal appearing across the secondary winding of output transformer 64, due to unequal currents flowing through the two halves of the primary winding of the transformer 64 when coils 14 and 15 are in a quiescent condition.

The operation of the circuit of Fig. 5 is also similar to that previously discussed, and the principal advantage of this circuit is that the transformers 56 and 64 may be of similar construction, thus reducing the cost of the apparatus.

Figure 6:
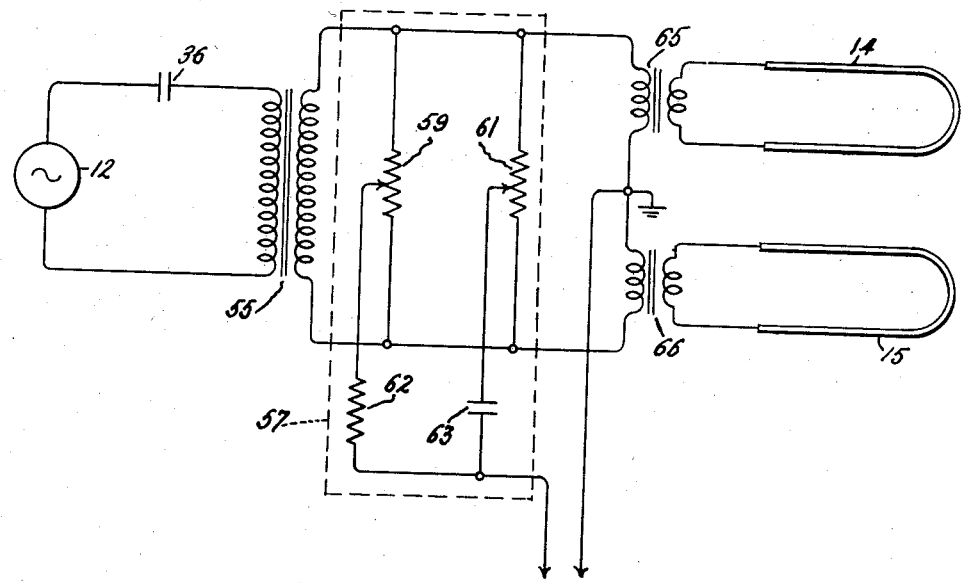
Fig. 6 is a schematic circuit diagram of another circuit arrangement.

A further modification of the circuit arrangement, such as shown in Fig. 6, may be made, if desired. In this arrangement, the source of oscillations 12 is again connected in series relationship with resonating capacitor 36 to the primary winding of energizing transformer 55. However, the secondary of transformer 55 is connected through balancing network 57 to the series-connected primary windings of two step-down impedance matching transformers 65 and 66, which are similar but not identical to transformers 39 and 41, shown in Figs. 1 and 3, and the secondary windings of transformers 65 and 66 are connected to the single-turn coils 14 and 15, respectively. One side of the output is taken from the potentiometers in balancing circuit 57, in order to balance out any unwanted signal in the manner previously discussed, and the other side of the output is taken from the midpoint of the series-connected primary windings of transformers 65 and 66, which point may be grounded. The principal advantage of this arrangement is that the low impedance matching transformers may be mounted on the coils, and all interconnections are in the high impedance portion of the circuit.

It is apparent that all of the circuit arrangements thus far described also may be modified by using only one of the single-turn coils 14 and 15 and replacing the other coil by an element whose impedance is equal to that of the coil, when there is no metallic particle within the field of the coil, and which does not respond to such metal particles. It is not believed necessary to illustrate such arrangements, because such modifications would be obvious to one skilled in the art.

Figure 7:
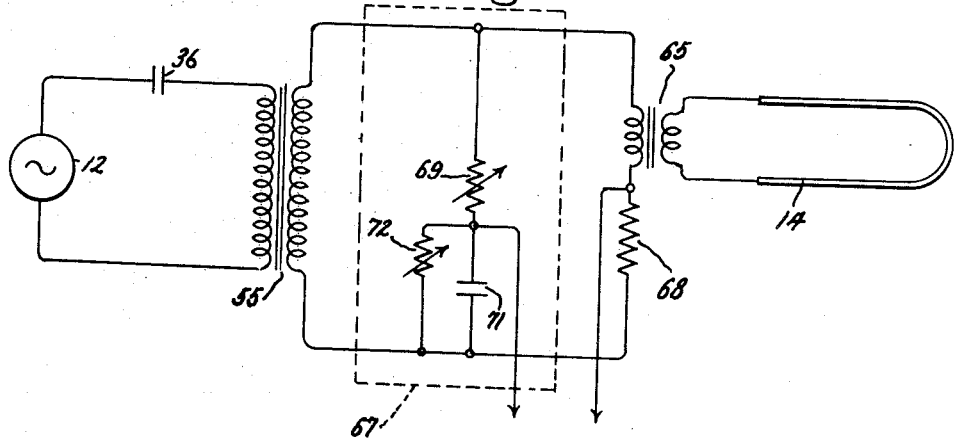
Fig. 7 is a schematic circuit diagram of a circuit arrangement employing only one coil in the novel detecting head assembly.

Fig. 7 illustrates a circuit arrangement specifically designed to include only one single-turn coil. The source of oscillations 12 is again connected through capacitor 36 to the primary of energizing transformer 55, and the secondary of transformer 55 is connected through a network 67 to the primary winding of step-down transformer 65. Here, however, the primary winding of transformer 65 is connected in series with a resistor 68. The matching network 67 is part of a conventional well-known Maxwell impedance bridge comprising variable resistance 69 and capacitor 71 connected in series across the secondary of transformer 55, with a variable resistance 72 connected across capacitor 71. This combination, together with the primary winding of transformer 65 and resistor 68, comprises the impedance bridge, and the output is taken from the midpoints of the bridge between variable resistor 69 and capacitor 71 and from between the primary of transformer 65 and resistor 68. By properly adjusting the variable resistors 69 and 72, the bridge may be balanced and the output signal, when there is no foreign metallic object in the field of coil 14, may be reduced to zero. The operation of this circuit is similar to those previously described and is believed to be obvious to one skilled in the art.

From the foregoing description, it can be readily appreciated that the invention provides an improved metal detecting apparatus which incorporates a new and improved detecting head assembly that is simple in construction, and relatively cheap to manufacture. It will also be appreciated that the new detecting head assembly greatly facilitates installation of the metal detecting apparatus in any desired environment, as well as subsequent maintenance operations, and, further, operates equally as well as previous, more expensive metal detectors of the same general type, wherein, heretofore, only multi-turn search coils were used. While in the present disclosure, the invention has been described in conjunction with single and double coil detecting head assemblies, it should be understood that metal detector devices may be designed in accordance with the invention which employ any number of such detecting coils in the detecting head assembly, depending upon the requirements of the objective to be accomplished. Furthermore, the material to be inspected need not be passed through the single-turn coil or coils, but need only pass through the magnetic fields of the coils.

Obviously, other modifications are possible in the light of the above teachings. It is, therefore, to be understood that changes may be made herein, which are within the full intended scope of the invention as defined by the appended claims.

What I claim as new and desire to secure by Letters Patent of the United States is:

1. A detecting head assembly for a metal detecting apparatus comprising one single-turn coil, an impedance-matching transformer having the secondary winding thereof operatively connected across said single-turn coil and having the primary winding thereof operatively connected to a source of electric energy for inducing electric current flow through said single-turn coil to produce an inspection field thereabout, and an output transformer having the primary winding thereof operatively connected to said single-turn coil for deriving an electric output signal indicative of the change in self inductance of said coil by reason of the appearance of a foreign metallic particle in the inspection field thereof.

2. The combination set forth in claim 1 wherein the single-turn coil comprises a mechanically rigid electrically conductive member shaped in the form of a loop.

3. A detecting head assembly for a metal detecting apparatus comprising a pair of spaced-apart single-turn coils connected in electrical series circuit relationship, an impedance-matching transformer having the secondary winding thereof operatively coupled across said single-turn coils and having the primary winding thereof operatively connected to a source of electric energy for inducing electric current flow through said single-turn coils to produce an inspection field thereabout, and a pair of step-up transformers each having the primary winding thereof connected across a respective single-turn coil and the secondary windings thereof interconnected for deriving an electric output signal indicative of the change in inductance of either one or both of said single-turn coils by reason of the appearance of a foreign metallic particle in the inspection fields thereof.

4. The combination set forth in claim 3 wherein each of said single-turn coils comprises an elongated mechanically rigid electrically conductive member shaped lengthwise in the form of a loop.

5. A detecting head assembly for a metal detecting apparatus comprising a pair of spaced-apart single-turn coils, a pair of impedance-matching transformers each having its secondary winding operatively coupled to a respective single-turn coil and having their primary windings serially connected to a source of electric energy for inducing electric current flow through said single-turn coils to produce an inspection field thereabout, and output means operatively coupled to each of said single-turn coils for deriving an electric output signal indicative of the change in inductance of either one or both of said single-turn coils by reason of the appearance of a foreign metallic particle in the inspection fields thereof.

6. The combination set forth in claim 5 wherein each of said single-turn coils comprises a mechanically rigid electrically conductive member shaped in the form of a loop.

References Cited in the file of this patent

UNITED STATES PATENTS

| | | |
|---|---|---|
| Re. 21,003 | Knerr et al. | Feb. 14, 1937 |
| 1,565,519 | Spooner | Dec. 15, 1925 |
| 1,957,222 | Mershon | May 1, 1934 |
| 2,202,884 | Zuschlag | June 4, 1940 |
| 2,557,994 | Ostlund | June 26, 1951 |
| 2,587,631 | Kuehne | Mar. 4, 1952 |